United States Patent [19]

Negishi

[11] Patent Number: 5,488,604
[45] Date of Patent: Jan. 30, 1996

[54] MAGNETO-OPTICAL DISK HAVING ZERO KERR ROTATION ANGLE AT ROOM TEMPERATURE

[75] Inventor: Nobuyasu Negishi, Tsurugashima, Japan

[73] Assignee: Pioneer Electronic Corporation, Tokyo, Japan

[21] Appl. No.: 300,384

[22] Filed: Sep. 2, 1994

[30]  Foreign Application Priority Data

Sep. 7, 1993  [JP]  Japan .................................. 5-221953

[51] Int. Cl.⁶ .............................. G11B 7/29; G11B 13/04
[52] U.S. Cl. ...................... 369/275.2; 369/13; 365/122; 428/694 RE; 428/694 ML
[58] Field of Search ........................ 369/13, 14, 275.2, 369/275.3, 275.4, 275.1; 360/59, 114; 365/122; 428/694 ML, 694 MT, 694 RE

[56]  References Cited

U.S. PATENT DOCUMENTS 4,794,560  12/1988  Bell et al. ................................. 369/13
  5,240,784  8/1993  Matsumoto .............................. 369/13
  5,317,555  5/1994  Takahashi et al. ....................... 369/13

FOREIGN PATENT DOCUMENTS

59-132434  7/1984  Japan .
  60-131660  7/1985  Japan .
   1201848  8/1989  Japan .
   5198027  8/1993  Japan .

*Primary Examiner*—Georgia Y. Epps
*Assistant Examiner*—Tan Dinh
*Attorney, Agent, or Firm*—Kane, Dalsimer, Sullivan, Kurucz, Levy, Eisele and Richard

[57]  ABSTRACT

A magneto optical disc is provided with: a substrate having a disc shape; and a ferrimagnetic layer formed on the substrate for recording information as a magnetization condition therein, the ferrimagnetic layer comprising material which Kerr rotation angle at a room temperature is substantially zero and which Kerr rotation angle at a predetermined reproducing temperature has a predetermined value other than zero, the predetermined reproducing temperature being higher than the room temperature and lower than a Curie point of the ferrimagnetic layer.

10 Claims, 13 Drawing Sheets

PRIOR ART

MAGNETO-OPTICAL DISK HAVING ZERO KERR ROTATION ANGLE AT ROOM TEMPERATURE

BACKGROUND OF THE INVENTION

1. Field of the Invention

The present invention generally relates to a magneto optical disc, to which information is recorded by magneto optical recording, and an apparatus for reproducing the same. More particularly, the present invention relates to a magneto optical disc of high density recording type, to which information having a spatial frequency higher than a spatial frequency prescribed by the wavelength of a reproducing light and a numerical aperture of an objective lens at the time of reproduction, is recorded, and an apparatus for reproducing the same.

2. Description of the Related Art

Information cannot be reproduced from a magneto optical disc, if the information is recorded with such a high density that the spatial frequency of the recorded information is higher than a cut off frequency prescribed by the wavelength of a reproducing light and a numerical aperture of an objective lens at the time of reproduction.

In order to overcome the above mentioned problem, a super resolution reproduction such as a MSR (Magnetically induced Super Resolution) may be employed.

Here, the MSR is explained.

In the field of microscope, a resolution is improved by disposing an optical mask such as a pin hole (i.e. a physical mask) at the position of the object. The MSR is such a technique that, instead of disposing the physical mask at the medium plane of the magneto optical disc, a substantial mask is formed within the medium by use of the temperature distribution in the medium, so as to effectively increase the spatial frequency at the limit of reproduction. Thus, it is possible to improved the recording density by about 1.5 to 3 times (refer to SUPER RESOLUTION MAGNETO OPTICAL DISC, Japanese Applied Magnetic Academy issue, Vol.15, No.5.1991 etc.)

Figure 13:
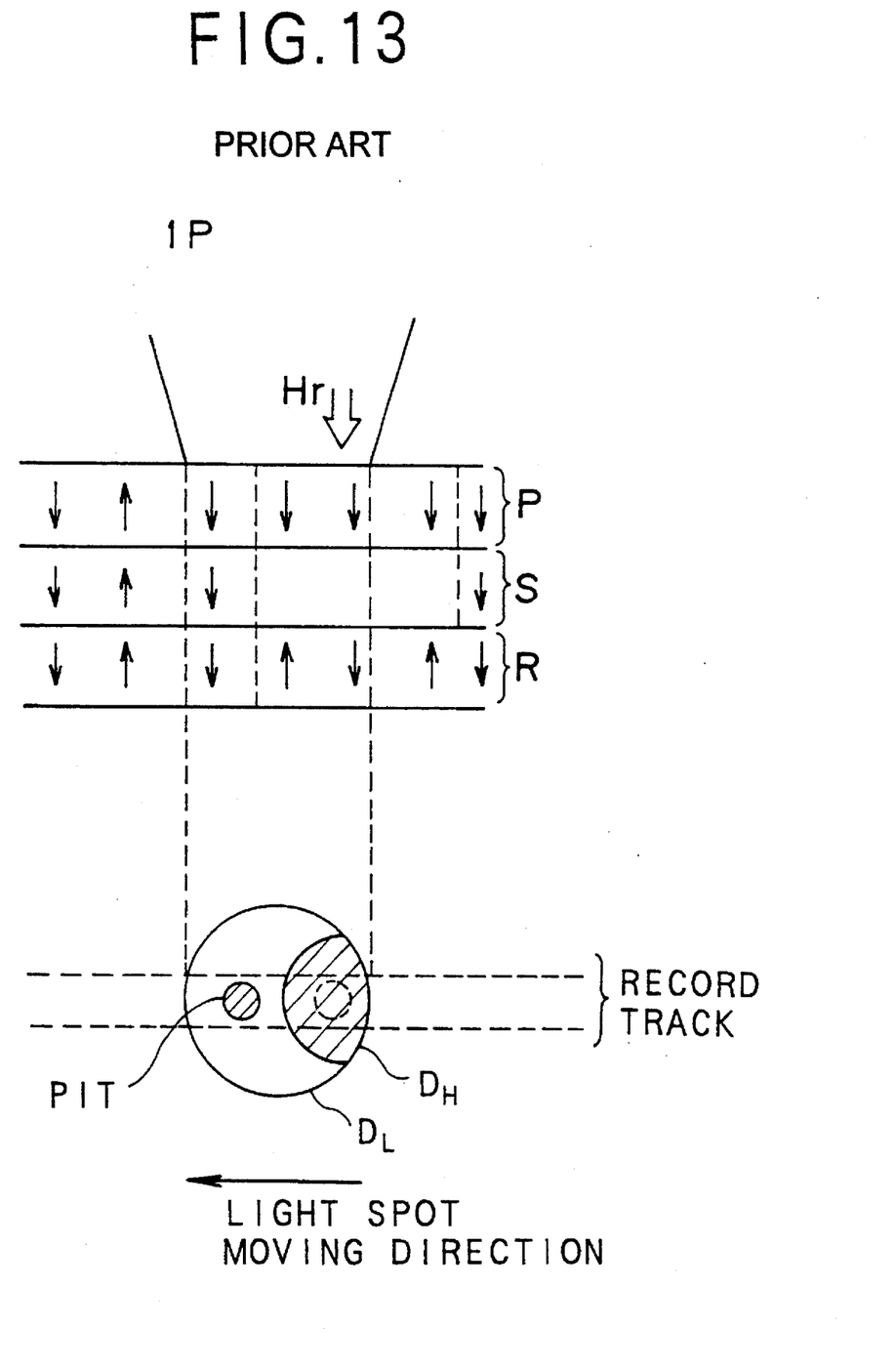
FIG. 13 is a diagram for explaining a principle of reproduction of a magneto optical disc according to the related art.

There may be propose various kinds of magneto optical discs, to which the MSR is applied. FIG. 13 shows a construction of an example of such a magneto optical disc.

As shown in FIG. 13, a magneto optical disc 1P is provided with: a reproducing layer P having a relatively small magnetic coercive force; a recording layer R to which information is recorded in a condition of vertical magnetization, and which has a relatively large magnetic coercive force; and a switching layer S for controlling the switched connection force between the reproducing layer P and the recording layer R.

Here, the reproducing operation of the above mentioned magneto optical disc is explained.

If the output power of the laser beam as the reproducing light is set to an appropriate value, a high temperature domain $D_H$ where the temperature is high, is formed at the back portion of the light spot as shown in FIG. 13.

When the temperature of the switching layer S at the high temperature domain $D_H$, becomes more than the Curie point, the magnetic domain of the switching layer S is disappeared. Namely, the magnetic coercive force becomes zero, so that the switched connection force between the reproducing layer P and the recording layer R becomes small. At the same time, if the external reproducing magnetic field Hr is applied, the magnetization directions of small portions of the reproducing layer P which has a small magnetic coercive force, are all aligned in the magnetization direction of the reproducing magnetic field Hr.

Therefore, the high temperature domain $D_H$ becomes a mask layer, where the record information of the recording layer R cannot be read out. The record information of the recording layer R becomes information from the low temperature domain $D_L$ shaped in a crescent shape within the light spot. Thus, the size of the light spot can be substantially reduced, so that the information having a spatial frequency higher than the physical spatial frequency of the light spot, can be reproduced. Namely, the super resolution reproduction can be performed.

There is another type of MSR, in which the low temperature domain is used as the mask domain and the high temperature domain is used as the detection domain, on the contrary.

In this manner, in order to realize the MSR, two conditions are required i.e. (1) a condition that only the record information of the high temperature domain within the beam is read out or only the record information at the high temperature domain is masked within the beam, and (2) a condition that the record information is not erased during the reproducing process.

However, the above explained type of magneto optical disc needs at least two magnetic layers, in order to fulfil the above mentioned conditions (1) and (2). Further, since the composition margin of each layer is narrow, it is difficult to manufacture such a magneto optical disc that consists of two or more than two of magnetic layers in this manner.

SUMMARY OF THE INVENTION

It is therefore an object of the present invention to provide a magneto optical disc, which is easy to manufacture, and which can realize the MSR by use of one magnetic layer.

The above object of the present invention can be achieved by a magneto optical disc provided with: a substrate having a disc shape; and a ferrimagnetic layer formed on the substrate for recording information as a magnetization condition therein, the ferrimagnetic layer comprising material which Kerr rotation angle at a room temperature is substantially zero and which Kerr rotation angle at a predetermined reproducing temperature has a predetermined value other than zero, the reproducing temperature being higher than the room temperature and lower than a Curie point of the ferrimagnetic layer.

According to the magneto optical disc of the present invention, the magneto optical disc is provided with a ferrimagnetic layer comprising material which Kerr rotation angle at a room temperature is substantially zero and which Kerr rotation angle at a predetermined reproducing temperature has a predetermined value other than zero, the reproducing temperature being higher than the room temperature and lower than a Curie point of the ferrimagnetic layer. Thus, the information recorded in the ferrimagnetic layer can be read out at the predetermined reproducing temperature, while the information is not erased during the reproducing process since the reproducing temperature is lower than the Curie point.

Accordingly, the ferrimagnetic layer fulfills the aforementioned two conditions to realize the MSR i.e. (1) the condition that only the record information of the high temperature domain within the beam is read out or only the record information at the high temperature domain is masked within the beam, and (2) the condition that the record information is not erased during the reproducing process. Consequently, the size of the light spot can be substantially reduced, and that the information having a spatial frequency higher than the physical spatial frequency of the light spot, can be reproduced. In this manner, the MSR reproduction can be performed according to the present invention.

The above object of the present invention can be also achieved by an apparatus for reproducing the information recorded on the above mentioned magneto optical disc of the present invention. The apparatus is provided with: an irradiating device for irradiating a reproducing light to a reproducing position of the magneto optical disc; an output power controlling device for controlling an output power of the reproducing light such that a temperature of the ferrimagnetic layer at the reproducing position becomes substantially equal to the predetermined reproducing temperature; and a reproducing device for receiving the reproducing light from the reproducing position and reproducing the information from the received reproducing light.

According to the reproducing apparatus of the present invention, the irradiating device irradiates a reproducing light to a reproducing position of the magneto optical disc, and the reproducing device receives the reproducing light from the reproducing position and reproduces the information from the received reproducing light. Here, the reproducing apparatus is further provided with the output power controlling device. The output power controlling device controls an output power of the reproducing light such that a temperature of the ferrimagnetic layer at the reproducing position becomes substantially equal to the predetermined reproducing temperature.

Accordingly, the output power of the reproducing light fulfills the aforementioned two conditions (1) and (2) to realize the MSR, with respect to the magneto optical disc of the present invention. Consequently, the super resolution reproduction can be performed.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1, which consist of FIG. 1a and FIG. 1b, are diagrams for explaining the principle of the Magnetically induced Super Resolution (MSR) in an embodiment of the present invention;

FIG. 3, which consist of FIG. 3a and FIG. 3b, are diagrams, in which

FIG. 4, which consist of FIG. 4a and FIG. 4b, are graphs showing the temperature dependency property of the Kerr rotation angle, in which

FIG. 9, which consist of FIG. 9a and FIG. 9b, are graphs showing the characteristic of the Kerr rotation angle, in which

FIG. 10, which consist of FIG. 10a and FIG. 10b, are graphs showing the characteristic of the Kerr rotation angle, in which

DETAILED DESCRIPTION OF THE PREFERRED EMBODIMENTS

Referring to the accompanying drawings, an embodiment of the present invention will be now explained.

Figure 1A:
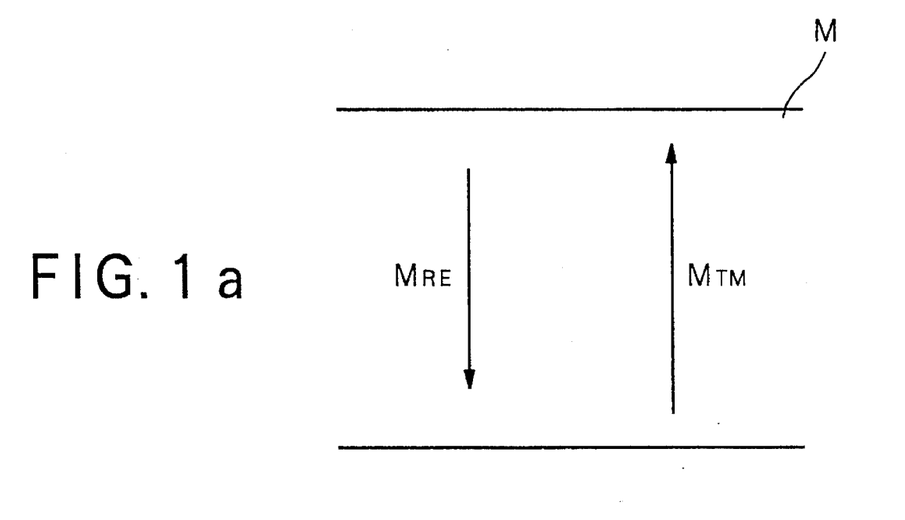
Figure 1B:
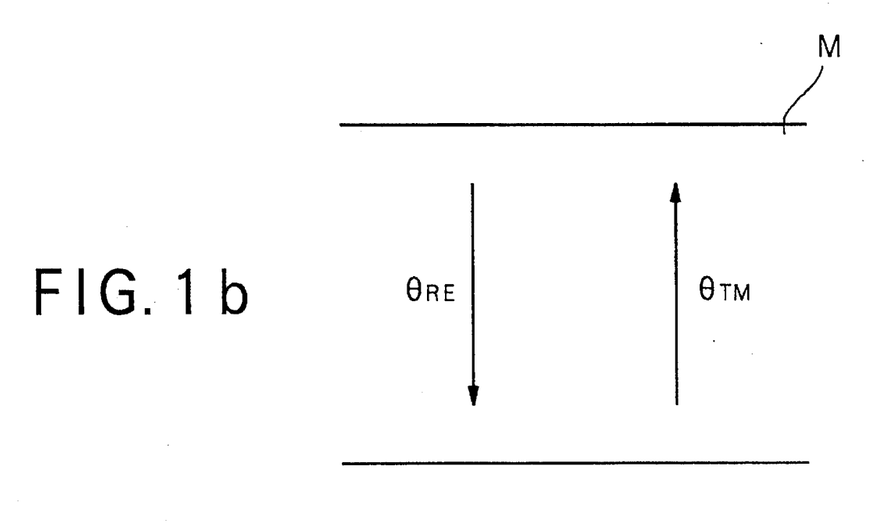

First of all, the principle of the magnetically induced super resolution (MSR) according to the present invention is explained with referring to FIG. 1.

As shown in FIG. 1a, the direction of magnetization $M_{RE}$ of RE (Rear Earth element) and the direction of magnetization $M_{TM}$ of TM (Transition Metal) in a magnetic layer M, are parallel and opposite to each other. For example, if the wavelength λ is at the vicinity of λ=400 nm, the Kerr rotation angle per unit magnetization of the RE is larger than that of the TM. Thus, even if $M_{RE} < M_{TM}$ as shown in FIG. 1a, there exists a certain temperature which satisfies the condition of $\Theta_{RE} = \Theta_{TM}$ (wherein $\Theta_{RE}$ represents the Kerr rotation angle of the RE and $\Theta_{TM}$ represents the Kerr rotation angle of the TM) in the magnetic layer M, as shown in FIG. 1b. At this time, the Kerr rotation angle $\Theta_K$ of the whole magnetic layer M, is expressed as following.

$$\Theta_K = \Theta_{TM} - \Theta_{RE} = 0$$

In case of the magneto optical disc of the present invention, the magnetic layer consists of RE (Rare earth element)—TM (Transition Metal) system, which composition is set such that the Kerr rotation angle $\Theta_K = 0$ at the room temperature with respect to the wavelength of the reproducing light.

Figure 2:
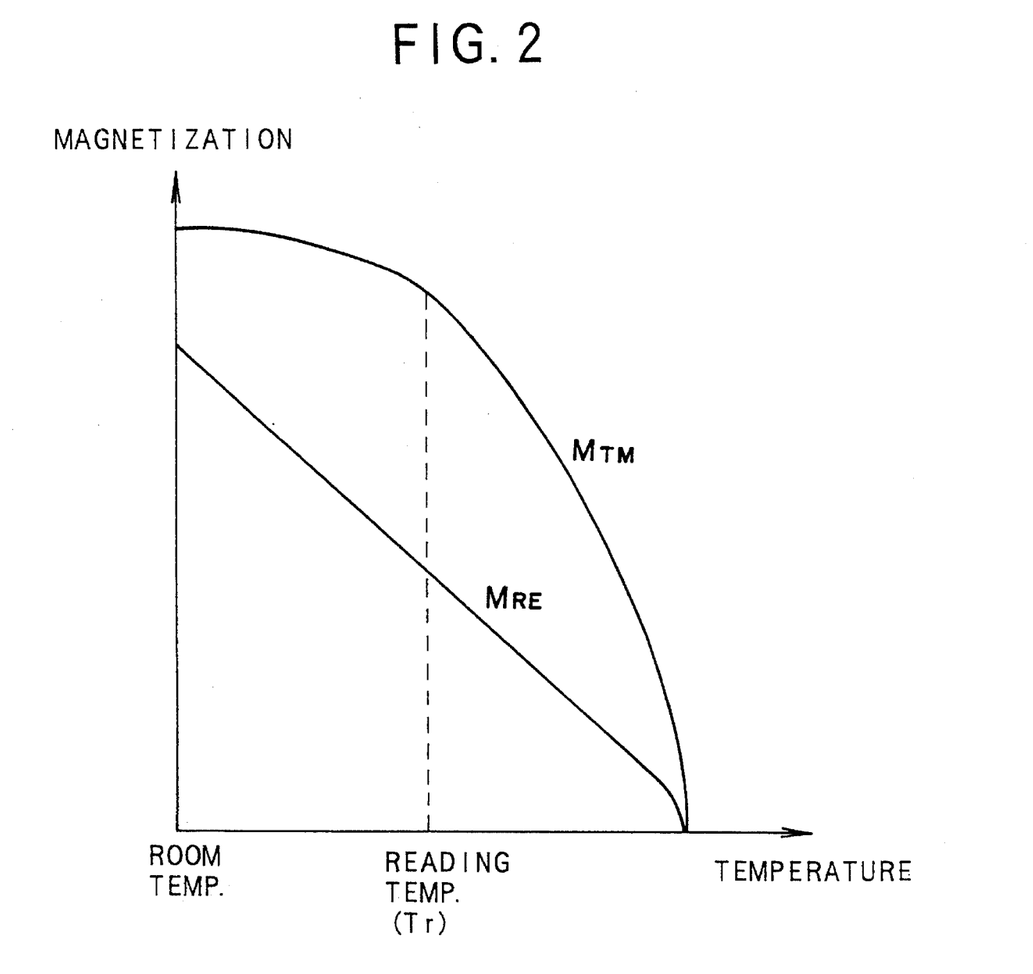
FIG. 2 is a graph for showing a temperature dependency property of the magnetization of RE (Rear Earth material)—TM (Transition Metal) system.
Figure 3A:
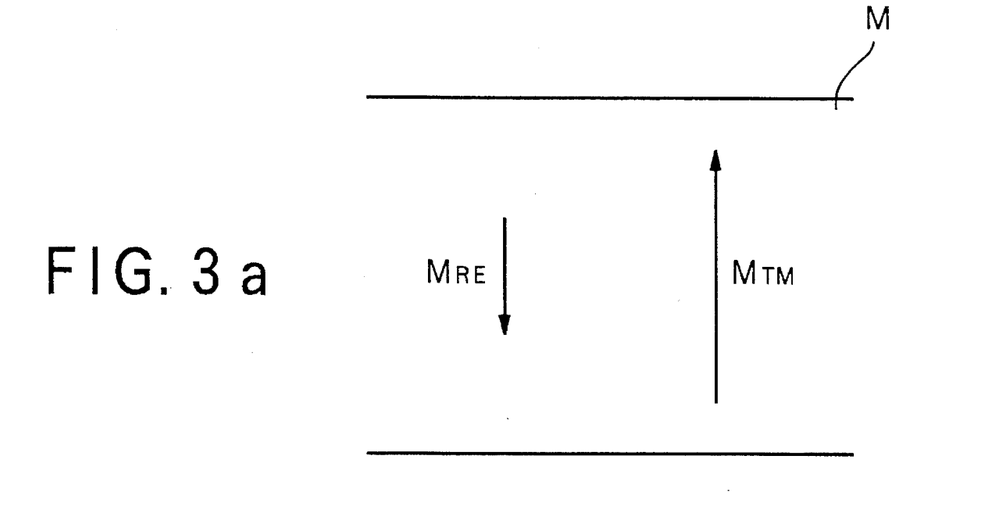
FIG. 3a shows magnitudes of the magnetization $M_{RE}$ of rare earth element and the magnetization $M_{TM}$ of transition metal at the reading temperature with respect to the room temperature.
Figure 3B:
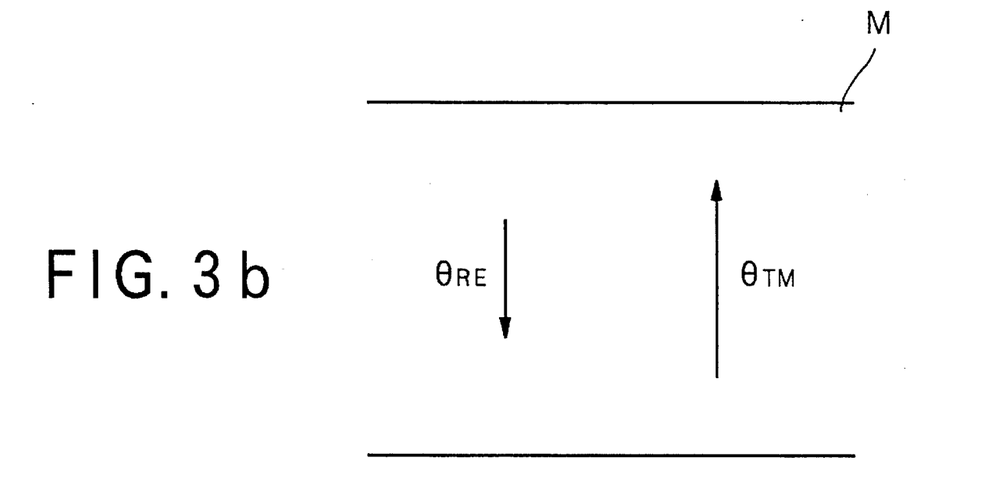
FIG. 3b shows magnitudes of the Kerr rotation angle $\Theta_{RE}$ and the Kerr rotation angle $\Theta_{TM}$ at the reading temperature with respect to the room temperature.

FIG. 2 shows the temperature dependency property of the magnetization of the RE—TM system of the present embodiment. As shown in FIG. 2, the curve of the temperature dependency property of the magnetization $M_{RE}$ and that of the $M_{TM}$, are different to each other when the temperature of the magnetic layer is increased. Thus, the $\Theta_K$ becomes to have a value other than zero. If the reading temperature Tr is set as shown in FIG. 2, the magnetization $M_{RE}$ and the magnetization $M_{TM}$ at the reading temperature Tr become 0.5 times and 0.9 times of the values at the room temperature respectively, as shown in FIG. 3a. Therefore, the Kerr rotation angle $\Theta_{RE}$ and $\Theta_{TM}$ of the RE and the TM at the reading temperature Tr also become 0.5 times and 0.9 times of the values at the room temperature as shown in FIG. 3b. Accordingly, the Kerr rotation angle $\Theta_K A$ becomes to have a value other than zero, as following.

$$\Theta_K = \Theta_{RE} - \Theta_{TM} \neq 0$$

In this manner, the Kerr rotation angle of a certain value can be obtained at the reading temperature.

Figure 4A:
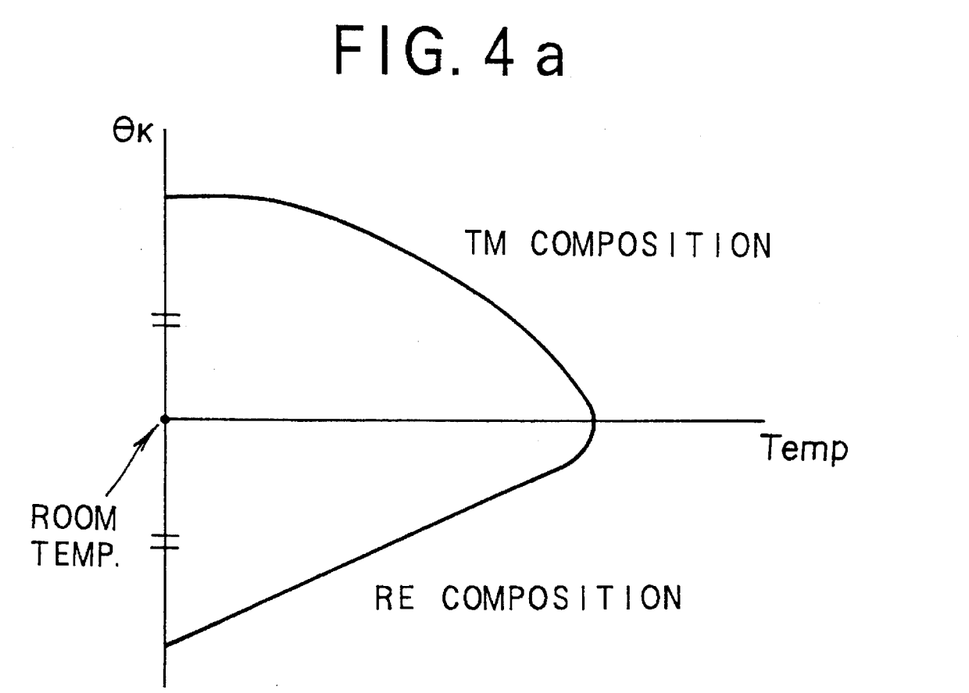
FIG. 4a is a graph showing that of the TM component and the RE component.
Figure 4B:
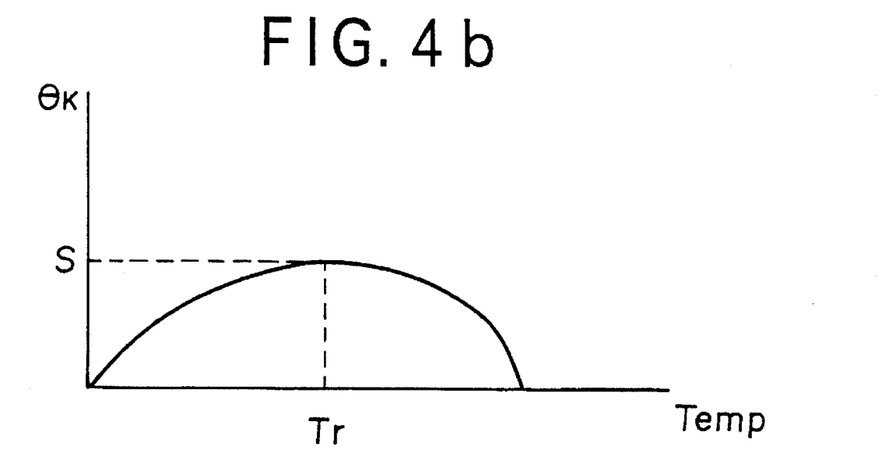
FIG. 4b is a graph showing that of the ferrimagnetic layer composed of alloy of TM and RE at the wavelength of the reading light.

FIG. 4a shows the temperature dependency property of the Kerr rotation angle of the transition metal (TM) composition and the rare earth element (RE) composition. FIG. 4b shows the temperature dependency property of the Kerr rotation angle at the wavelength of the reading light of the ferrimagnetic layer made of the alloy of the transition metal (TM) and the rare earth element (RE) system. Since the temperature Tr where $\Theta_K = S$, is not higher than the Curie point, the record information is maintained even if the reproducing light corresponding to this temperature is irradiated. Thus, the aforementioned two conditions to realize the MSR i.e. (1) the condition that only the record information of the high temperature domain within the beam is read out or only the record information at the high temperature domain is masked within the beam, and (2) the condition that the record information is not erased during the reproducing process, are fulfilled, according to the present invention.

Figure 5:
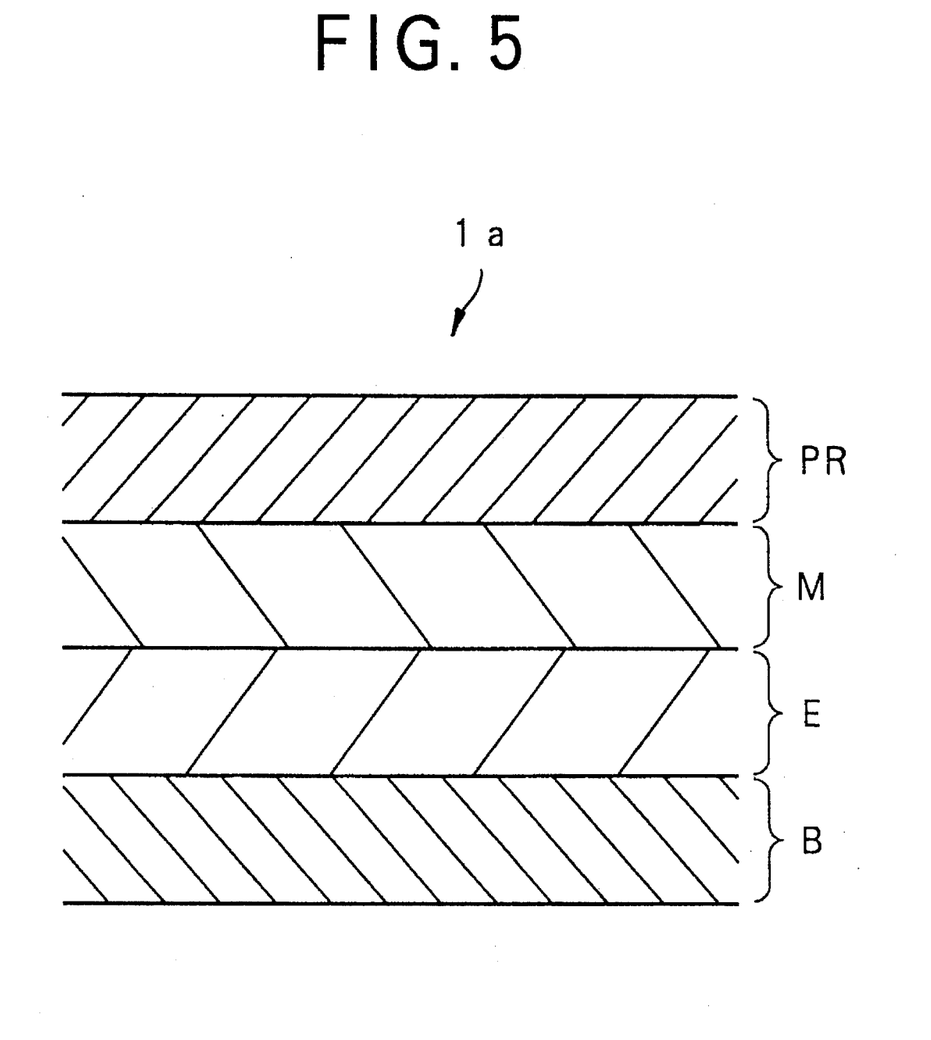
FIG. 5 is a cross sectional view of a magneto optical disc of the first embodiment.

FIG. 5 shows the cross section of a magneto optical disc 1a of a first embodiment according to the present invention.

The magneto optical disc 1a is provided with: a substrate B; an enhance foundation film E; a magnetic layer M comprising a ferrimagnetic layer, which Kerr rotation angle is about zero at the room temperature and which Kerr rotation angle at a predetermined reproducing temperature has a certain value other than zero; and a protection layer PR for protecting the magnetic layer M.

As the substrate B, a substrate of polycarbonate, a substrate of resin such as acrylic resin or epoxy resin, a glass substrate, a substrate which is constructed by forming guide grooves on a glass by a ultraviolet hardening resin, and so on, may be used. The enhance foundation film E enhances the magnetization of the magnetic layer M, and also has a function to adjust the reflection coefficient of the disc. As materials of the enhance foundation film E, single substance or mixture of $Al_2O_3$, $SiO_2$, $ZrO_2$, $TiO_2$, $Ta_2O_5$, AlN, ZnO, $Si_3N_4$, SiAlON, Zns etc. may be used, and the thickness of the film E is about 100 to 4000 angstroms.

The magnetic layer M, to which the information is recorded in the magnetization condition, is made from the alloy of rare earth element (RE) and transition material (TM), and the thickness of the magnetic layer M is about 100 to 2000 angstrom. As the rare earth element, single substance or mixture of Gd, Tb, Dy etc., may be used. As the transition metal, single substance or mixture of Fe, Co, Ni etc. may be used.

As materials of the protection film PR, the materials same as the enhance foundation film E, may be used, and the thickness of the protection film PR is about 100 to 4000 angstrom.

Figure 6:
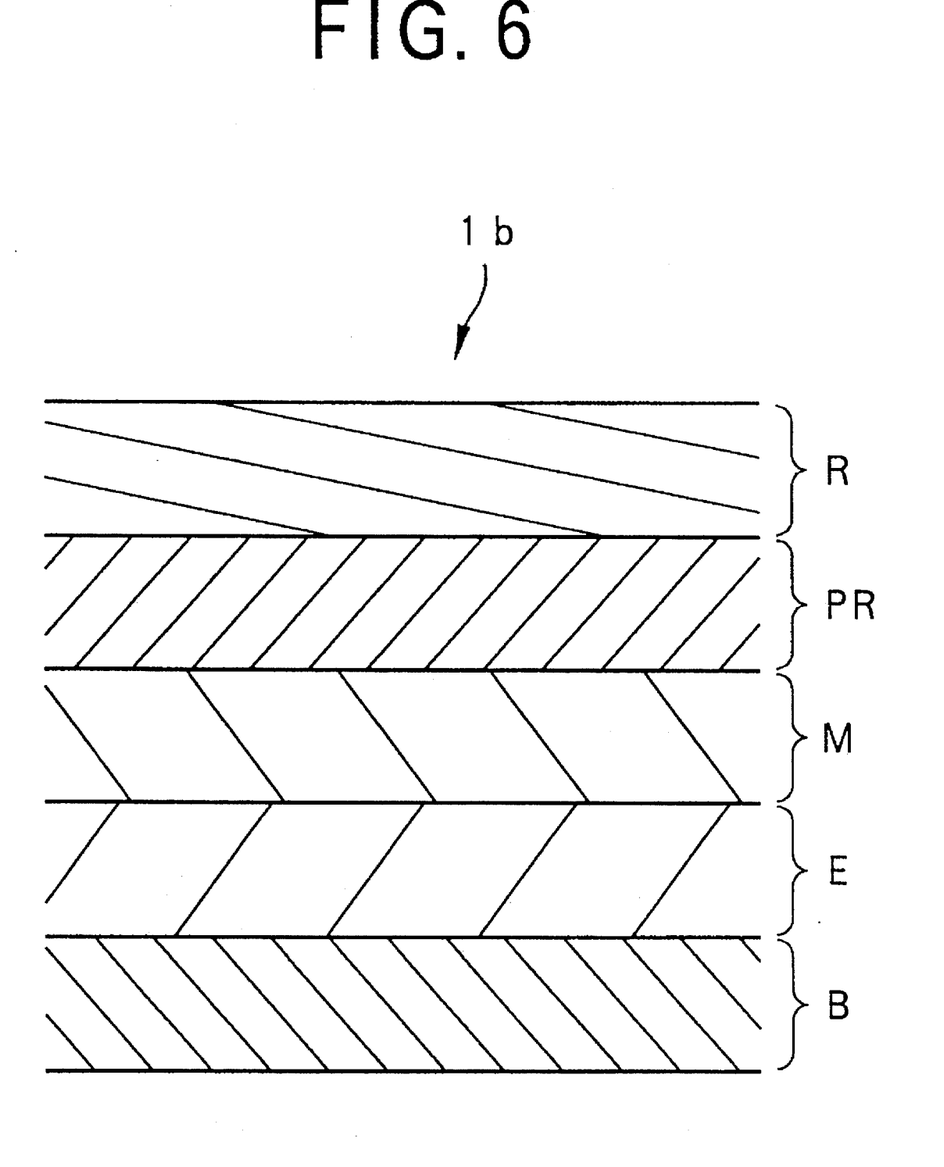
FIG. 6 is a cross sectional view of a magneto optical disc of the second embodiment.

FIG. 6 shows a cross sectional view of a magneto optical disc 1b as a second embodiment according to the present invention. The same elements as those in the first embodiment of FIG. 5, carry the same reference marks, and the explanations thereof are omitted.

In the magneto optical disc 1b of the second embodiment, a reflecting film R made of metal which main component is single substance or mixture of Al, Ti, Au, is formed on the protection film PR in the construction of the first embodiment of FIG. 5. The thickness of the reflecting film R, is about 50 to 2000 angstroms.

Figure 7:
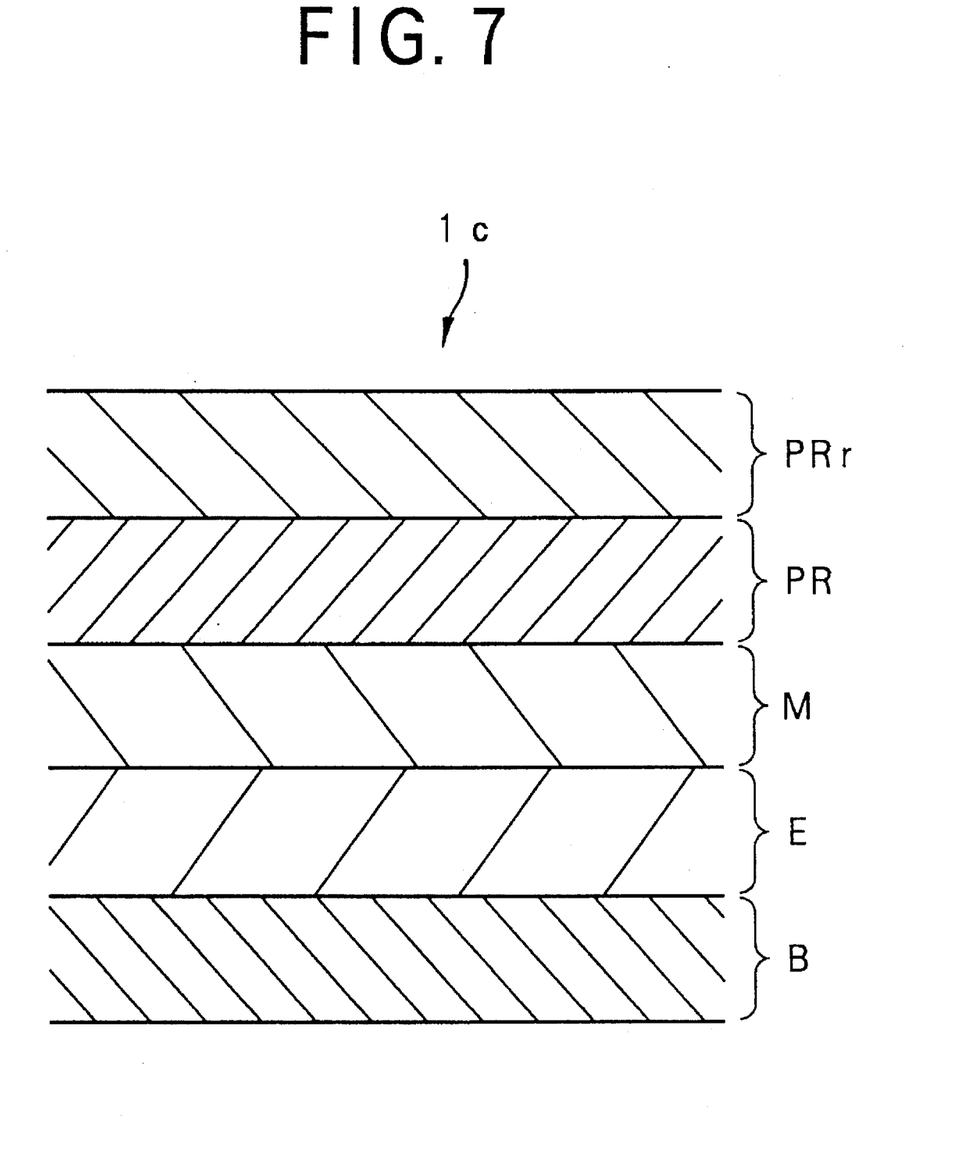
FIG. 7 is a cross sectional view of a magneto optical disc of the third embodiment.

FIG. 7 shows a cross sectional view of a magneto optical disc 1c as a third embodiment according to the present invention. The same elements as those in the first embodiment of FIG. 5, carry the same reference marks, and the explanations thereof are omitted.

In the magneto optical disc 1c of the third embodiment, a protection layer PRr made from resin, is formed on the protection layer PR in the construction of the first embodiment of FIG. 5.

Figure 8:
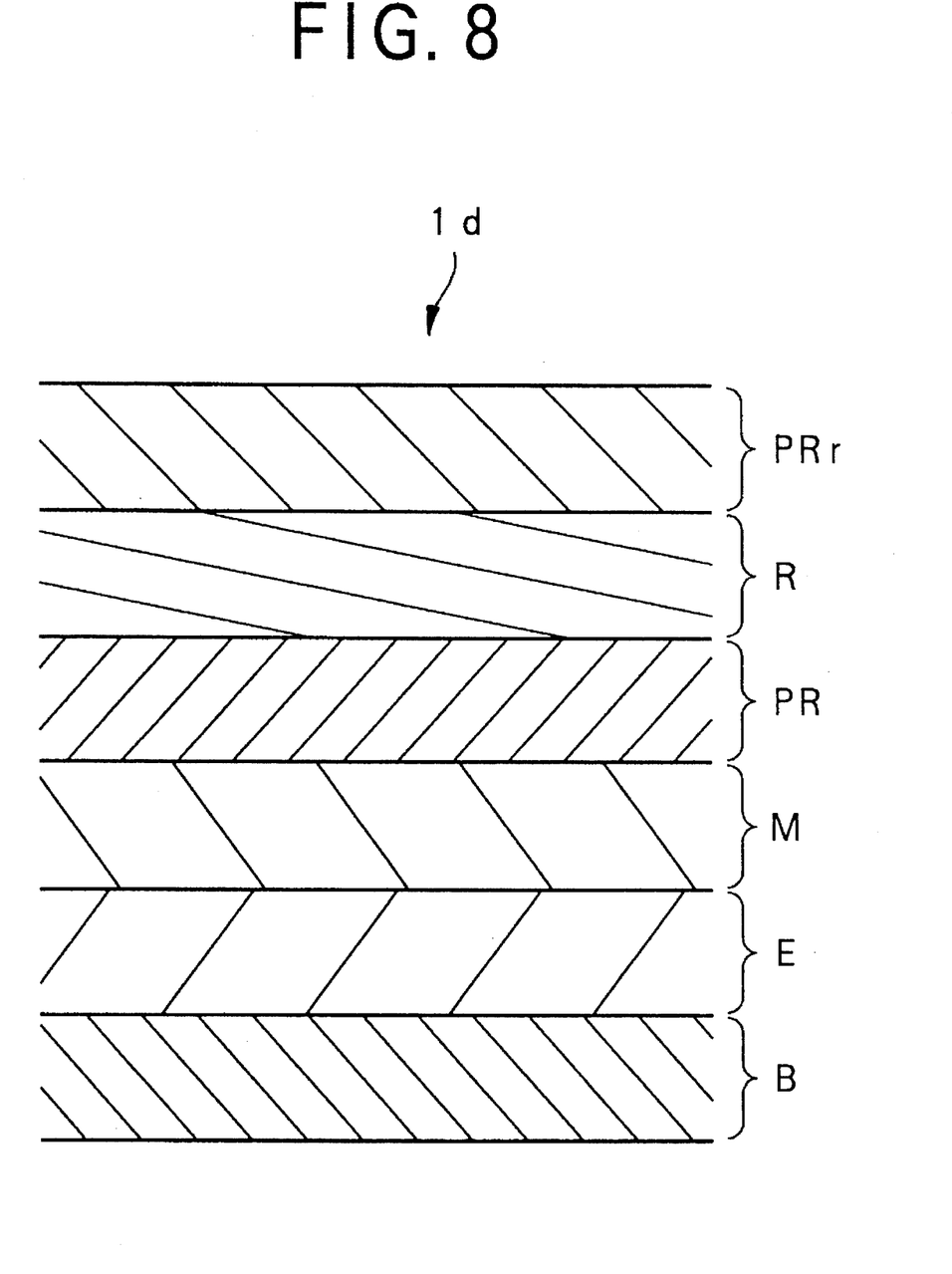
FIG. 8 is a cross sectional view of a magneto optical disc of the fourth embodiment.

FIG. 8 shows a cross sectional view of a magneto optical disc 1d as a fourth embodiment according to the present invention. The same elements as those in the second embodiment of 6, carry the same reference marks, and the explanations thereof are omitted.

In the magneto optical disc 1d of the fourth embodiment, a protection layer PRr made from resin, is formed on the reflecting layer R in the construction of the second embodiment of FIG. 6.

Further, each magneto optical disc 1a to 1d of the first to fourth embodiments, may be respectively modified to a both sides type disc.

Nextly, the magnetic layer M will be explained in more detail.

As the material of the magnetic layer M, an alloy of the rare earth element (RE), which main component is Tb, Dy such as TbFe, TbFeCo, DyFe, GdDyFe etc., and the transition metal (TM), which main component is Fe, Co, Ni, may be used. The magnetic characteristics of two examples of such an alloy, is shown in FIGS. 9 and 10.

Figure 9A:
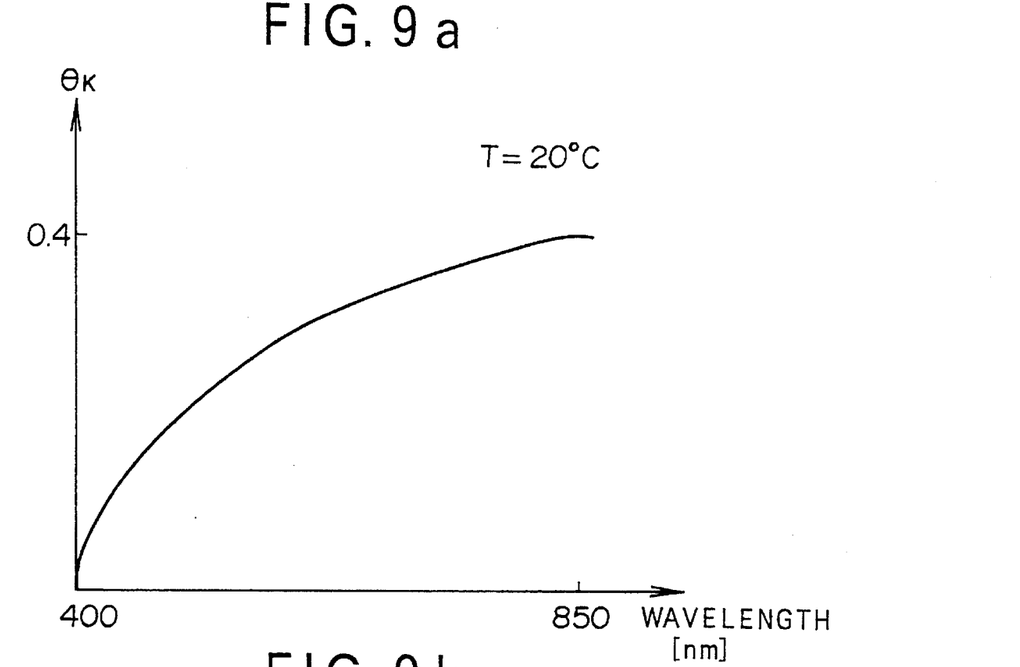
FIG. 9a is a graph showing the wavelength dependency property of the Kerr rotation angle of alloy $Tb_{19}(Fe_{88}Co_{12})_{81}$ at % at the temperature of 20° C.
Figure 9B:
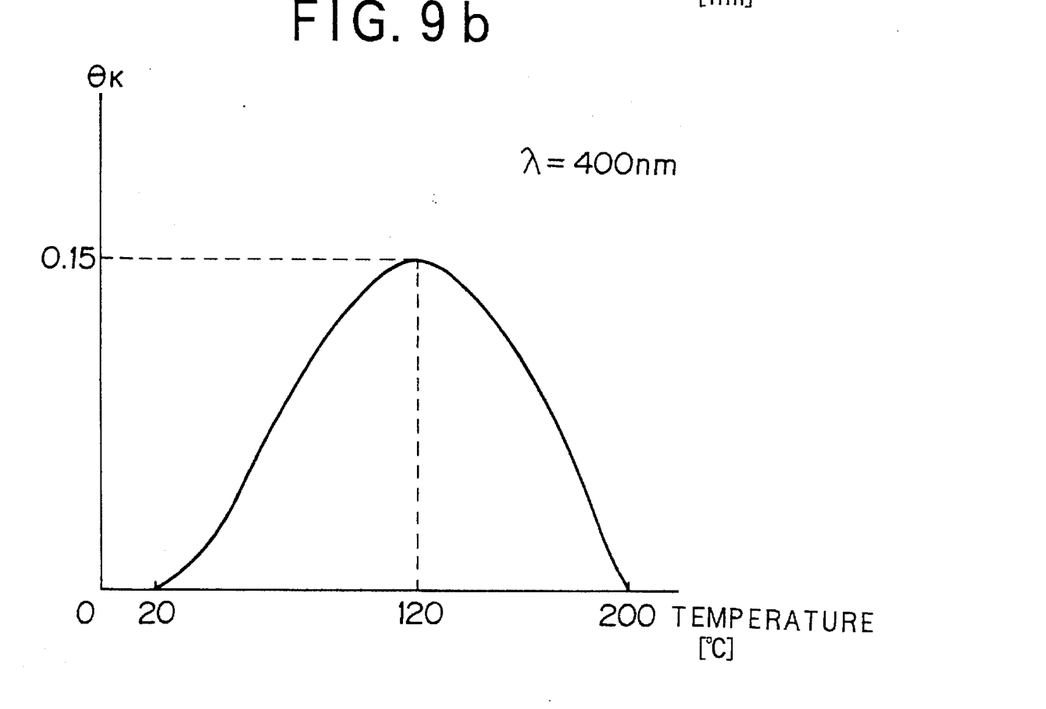
FIG. 9b is a graph showing the temperature dependency property of the Kerr rotation angle of the alloy $Tb_{19}(Fe_{88}Co_{12})_{81}$ at % at the wavelength of 400 nm.

FIG. 9 show the magnetic characteristic of $Tb_{19}(Fe_{88}Co_{12})_{81}$ at %.

FIG. 9a is a graph showing the wavelength dependency property of the Kerr rotation angle of the alloy of $Tb_{19}(Fe_{88}Co_{12})_{81}$ at % at the temperature of 20° C. From FIG. 9a, it is understood that the magnetic layer becomes the MSR film in case that the wavelength is 400 nm, since the Kerr rotation angle $\Theta_K$ becomes zero with respect to the reading light having wavelength of 400 nm. FIG. 9b is a graph showing the temperature dependency property of the Kerr rotation angle of the alloy of $Tb_{19}(Fe_{88}Co_{12})_{81}$ at % at the wavelength of 400 nm. From FIG. 9b, it is understood that the MSR can be achieved by setting the reading temperature of the reproducing light to about 120° C., since the aforementioned conditions (1) and (2) to achieve the MSR can be fulfilled at this temperature.

Figure 10A:
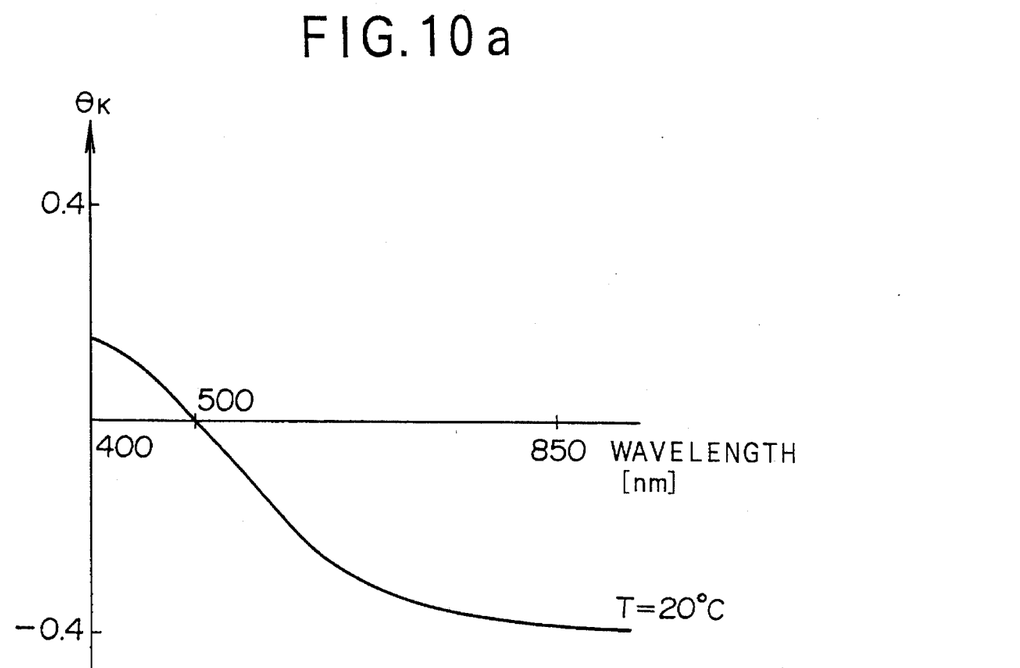
FIG. 10a is a graph showing the wavelength dependency property of the Kerr rotation angle of alloy $Tb_{25}(Fe_{88}Co_{12})_{75}$ at % at the temperature of 20° C.
Figure 10B:
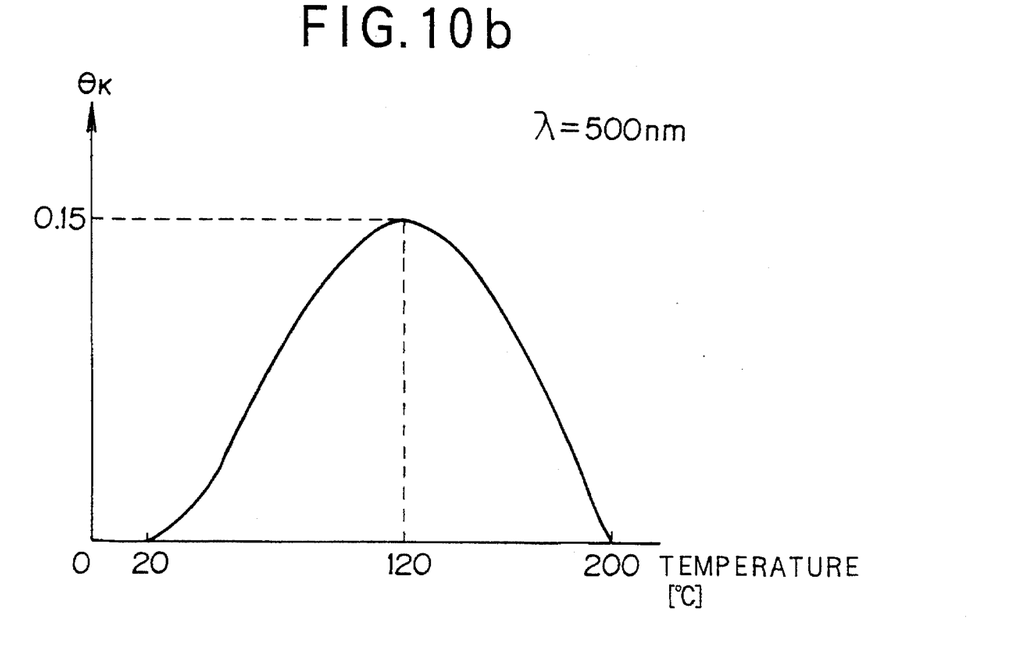
FIG. 10b is a graph showing the temperature dependency property of the Kerr rotation angle of the alloy $Tb_{25}(Fe_{88}Co_{12})_{75}$ at % at the wavelength of 500 nm.

FIG. 10 shows the magnetic characteristic of the $Tb_{25}(Fe_{88}Co_{12})_{75}$ at %.

FIG. 10a is a graph showing the wavelength dependency property of the Kerr rotation angle of the alloy of $Tb_{25}(Fe_{88}Co_{12})_{75}$ at % at the temperature of 20° C. From FIG. 10a, it is understood that the magnetic layer M becomes the MSR film in case that the wavelength is 500 nm, since the Kerr rotation angle $\Theta_K$ becomes zero with respect to the reading light having wavelength of 500 nm. FIG. 10b is a graph showing the temperature dependency property of the Kerr rotation angle of the alloy $Tb_{25}(Fe_{88}Co_{12})_{75}$ at % at the wavelength of 500 nm. From FIG. 10b, it is understood that the MSR can be achieved by setting the reading temperature of the reproducing light to about 120° C., since the aforementioned conditions (1) and (2) to achieve the MSR can be fulfilled at this temperature.

Figure 11:
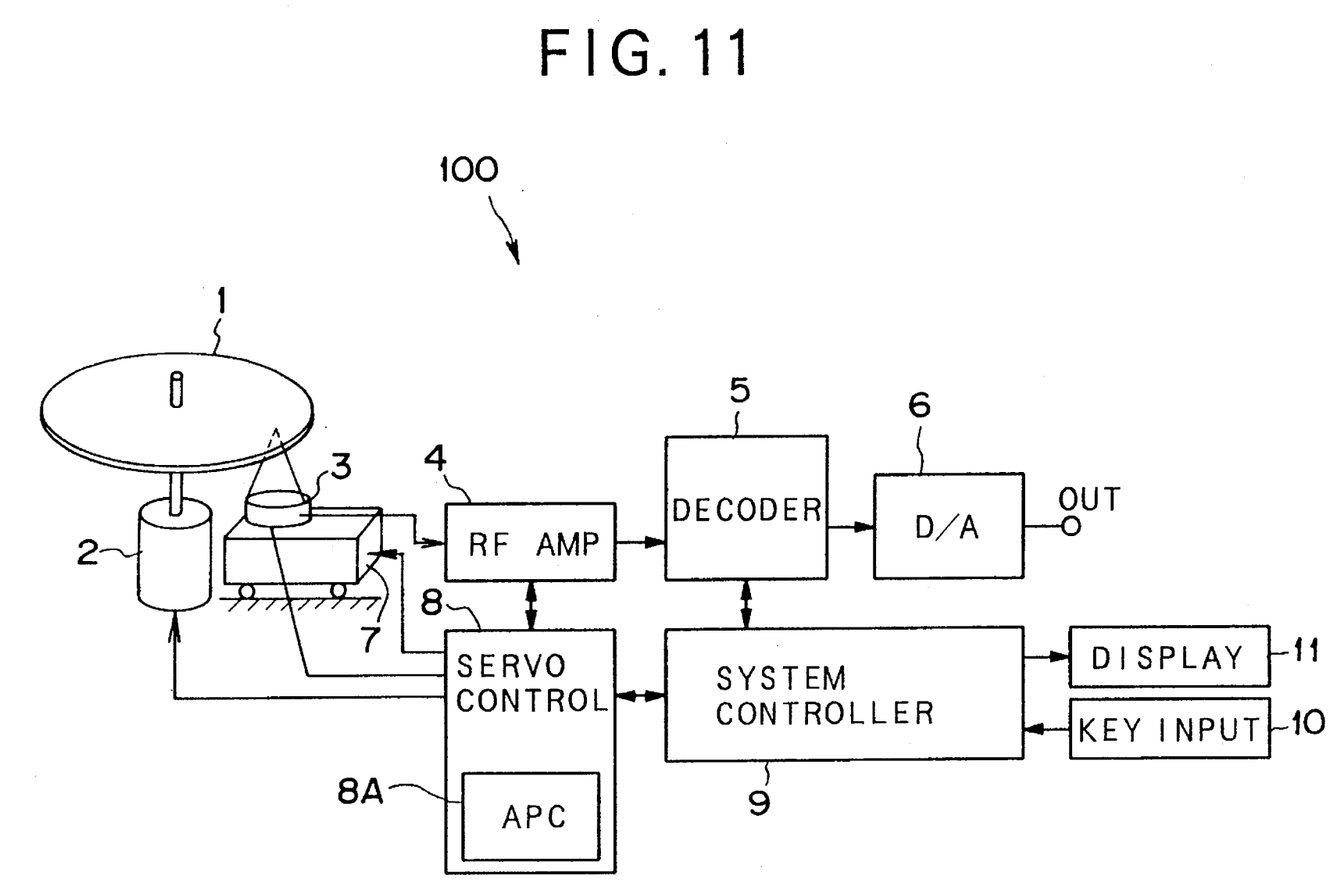
FIG. 11 is a block diagram showing a construction of an apparatus for reproducing a magneto optical disc of the present embodiment.

FIG. 11 shows a block diagram of an optical disc reproducing apparatus for reproducing digital data recorded on the magneto optical disc as an analog signal, according to the present invention.

In FIG. 11, an optical disc reproducing apparatus 100 is provided with: a spindle motor 2 for driving and rotating the magneto optical disc 1; an optical pickup 3, which has a laser diode, an actuator, and a polarization beam splitter, for irradiating a laser beam onto the rotated magneto optical disc 1, receiving the light beam, which is reflected and returned from the magnetic layer of the magneto optical disc 1 and which polarization plane is slightly rotated due to the magnetic Kerr effect, and outputting the signal component in the received light beam as a RF (Radio Frequency) signal; a RF amplifier 4 for amplifying the RF signal to an appropriate level; a decoder 5 for decoding the modulated signal, which corresponds to the record information, from the amplified RF signal; a D/A (Digital to Analog) convertor 6 for converting the digital data, which is decoded by the decoder 5, to an analog information signal; a carriage 7 for driving the optical pickup 3 in the radial direction of the magneto optical disc 1; a servo-controlling circuit 8 for servo-controlling the spindle motor 2, the carriage 7 and the actuator of the optical pickup 3; a system controller 9 for controlling the whole portion of the optical disc reproducing apparatus 100; a key inputting unit 10 for giving operation instructions to the system controller 9 form the external; and a displaying unit for displaying the information reproducing condition etc. on a display screen.

The servo-controlling circuit 8 is provided with an APC (Automatic Power Control) circuit 8A, which receives the output light by a monitor photodiode provided in the laser diode of the optical pickup 3, and which controls the driving electric current to the laser diode so as to keep the light output of the laser diode at a predetermined reproducing output power level.

Figure 12:
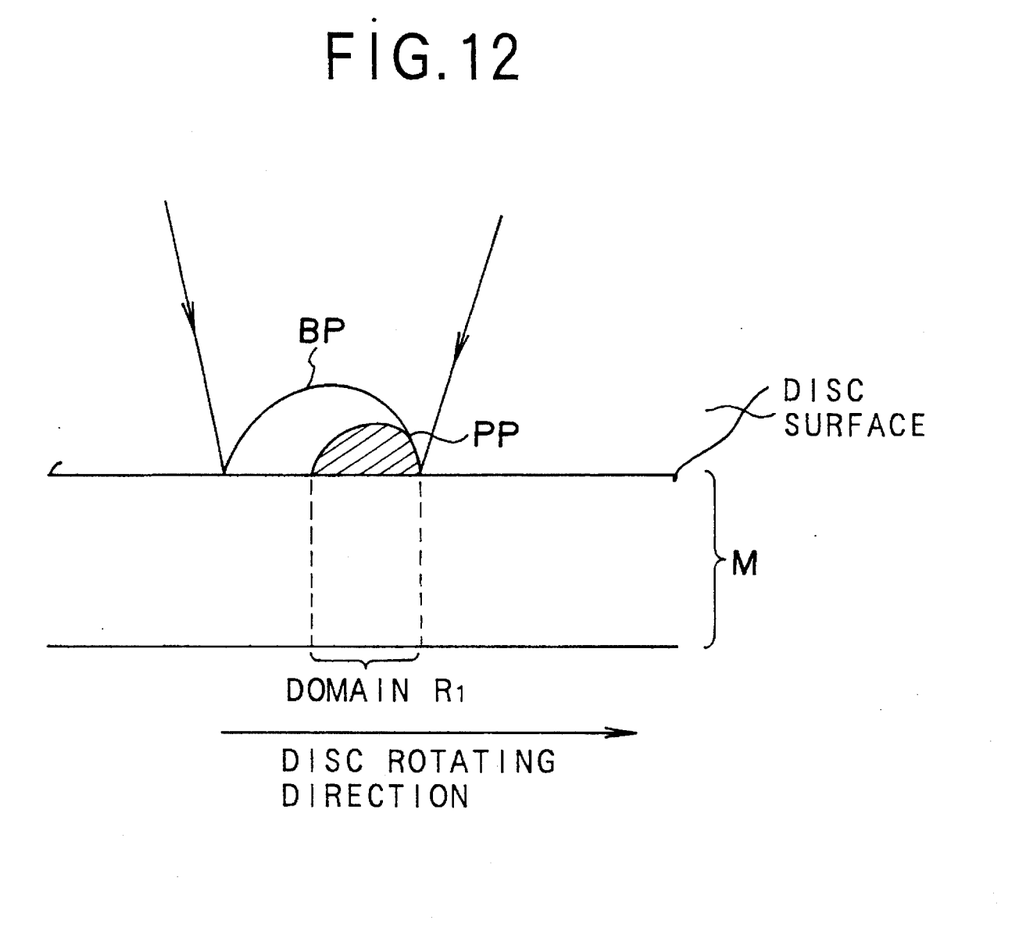
FIG. 12 is a diagram for explaining the reproducing operation of the present embodiment.

Nextly, the reproducing operation of the optical disc reproducing apparatus is explained with referring to FIG. 12.

As shown in FIG. 12, when the information is to be reproduced, the laser beam, which is linearly polarized, is irradiated as the reproducing light to a predetermined domain BP including a reproducing position PP, by the optical pickup 3, so that the temperature at the reproducing position PP is increased to be the predetermined reproducing temperature at which the magnetic layer M becomes in the condition to have the predetermined Kerr rotation angle.

As a result, the polarization plane of the laser beam irradiated onto the magnetic layer M at the reproducing position PP, is rotated in a direction corresponding to the vertical magnetization direction of the magnetic layer M. The magnetic Kerr rotation angle, which is the rotation angle of the polarization plane, is detected by the optical pickup 3, and the information is reproduced by use of the rotation angle through the RF amplifier 4, the decoder 5 and the D/A convertor 6.

Namely, within the irradiated domain BP of the laser beam of the reading light, only the information at a domain $R_1$ corresponding to the reproducing position PP where the magnetic layer M becomes in a condition to have the Kerr rotation angle of the predetermined value, can be reproduced, so that the magnetically induced super resolution can be performed.

As described above in detail, according to the present embodiment, the magneto optical disc is provided with the ferrimagnetic layer. The Kerr rotation angle of the ferrimagnetic layer at the room temperature is substantially zero. The Kerr rotation angle of the ferrimagnetic layer at the predetermined reproducing temperature, which is higher than the room temperature and is lower than the Curie point, has a certain value other than zero. Accordingly, the information can be read out only at the reproducing position corresponding to the position where the magnetic layer becomes in a condition to have the Kerr rotation angle of the certain value. As a result, by constructing the optical system so as to detect the information from this reproducing position, the information from the small domain, which is smaller than the spot diameter of the reproducing light, can be reproduced. The super resolution reproduction can be realized by the magneto optical disc having only one magnetic layer i.e. one ferrimagnetic layer. The magneto optical disc can be easily manufactured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magneto optical disc comprising:
   a substrate having a disc shape; and
   a single ferrimagnetic layer formed on said substrate for recording information as a magnetization condition therein, said ferrimagnetic layer comprising material which Kerr rotation angle at a room temperature is substantially zero and which Kerr rotation angle at a predetermined reproducing temperature has a predetermined value other than zero, said predetermined reproducing temperature being higher than said room temperature and lower than a Curie point of the ferrimagnetic layer.

2. A magneto optical disc according to claim 1, wherein said ferrimagnetic layer comprises alloy of rare earth element and transition metal.

3. A magneto optical disc according to claim 2, wherein said rare earth element comprises one selected from a group of TbFe, TbFeCo, DyFe and GdDyFe, and said transition metal comprises one selected from a Group of Fe, Co and Ni.

4. A magneto optical disc according to claim 1, further comprising an enhance foundation film disposed between said substrate and said ferrimagnetic layer, for enhancing the magnetization of the ferrimagnetic layer.

5. A magneto optical disc according to claim 1, further comprising a protection layer formed on said ferrimagnetic layer for protecting said ferrimagnetic layer.

6. A magneto optical disc according to claim 5 further comprising a reflecting layer formed on said protection layer for reflecting a reproducing light irradiated on said magneto optical disc.

7. A magneto optical disc according to claim 6, further comprising another protection layer formed on said reflecting layer for protecting said reflecting layer.

8. An apparatus for reproducing information recorded on a magneto optical disc,
   said magneto optical disc comprising:
   a substrate having a disc shape; and a single ferrimagnetic layer formed on said substrate for recording the information as a magnetization condition therein, said ferrimagnetic layer comprising material which Kerr rotation angle at a room temperature is substantially zero and which Kerr rotation angle at a predetermined reproducing temperature has a predetermined value other than zero, said predetermined reproducing temperature being higher than said room temperature and lower than a Curie point of the ferrimagnetic layer, said apparatus comprising:

an irradiating means for irradiating a reproducing light to a reproducing position of said magneto optical disc;

an output power controlling means for controlling an output power of said reproducing light such that a temperature of said ferrimagnetic layer at said reproducing position becomes substantially equal to said predetermined reproducing temperature; and a reproducing means for receiving the reproducing light from said reproducing position and reproducing the information from the received reproducing light.

9. An apparatus according to claim 8, wherein said output power controlling means comprises an APC (Automatic Power Control) circuit.

10. An apparatus according to claim 8, wherein said reproducing means detects the Kerr rotation angle at the reproducing position to reproduce the information from the detected Kerr rotation angle.

* * * * *